Figure 1:

March 5, 1929.                H. JUNKERS                1,704,326
                       CORRUGATED SHEET METAL SHAPE
                          Filed July 22, 1925          2 Sheets-Sheet 1

Inventor:
Hugo Junkers
by [signature]
Atty.

March 5, 1929.                    H. JUNKERS                    1,704,326
                          CORRUGATED SHEET METAL SHAPE
                            Filed July 22, 1925        2 Sheets-Sheet 2
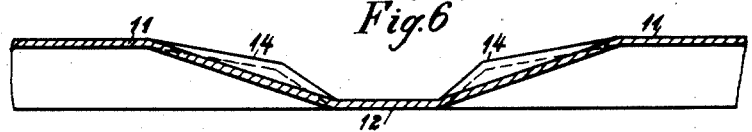
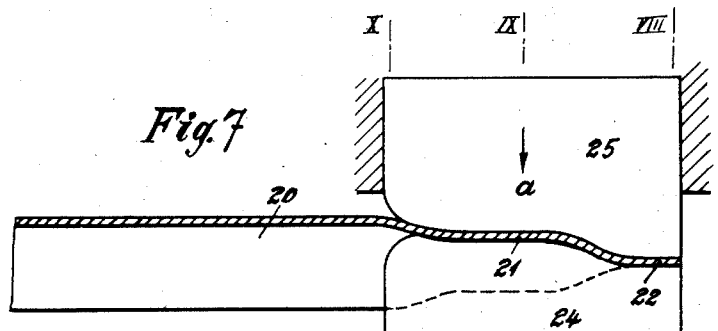
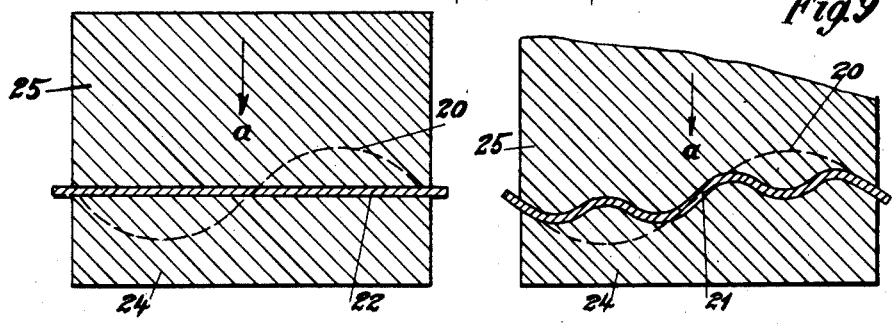
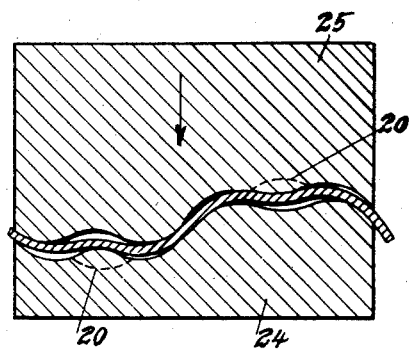
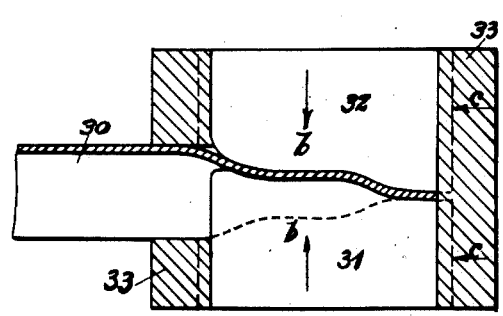
Inventor:
Hugo Junkers
by Kunichaun
Atty.

Patented Mar. 5, 1929.

1,704,326

UNITED STATES PATENT OFFICE.

HUGO JUNKERS, OF DESSAU, GERMANY.

CORRUGATED SHEET-METAL SHAPE.

Application filed July 22, 1925, Serial No. 45,382, and in Germany August 9, 1924.

My invention refers to corrugated sheet metal and more especially to the connection between corrugated sheet metal and other corrugated or non-corrugated parts of a structure, more particularly a flying machine, boat or the like.

It is a particular object of my invention to provide means whereby such connection can be effected in an easier and more efficient manner than was hitherto possible.

In effecting the connection between corrugated sheet metal shapes, such as form part for instance of flying machines or boats, it is necessary in order to obtain a satisfactory connection, which will also keep tight, that either the abutting ends of the two corrugated sheet metal parts to be connected register exactly both regarding the configuration and the position of the corrugations or, in the case of non-corrugated parts, such as transverse bulkheads, that the abutting end of such part be adapted exactly to the corrugations of the sheet metal, or else the abutting edge of the sheet metal must be made plane in order to enable it to be easily connected to the other part by riveting, welding or the like. Such conversion is however accompanied by a considerable upsetting of the sheet metal, which presents great difficulties more especially if high grade light metal sheets of great hardness such as duraluminium are used.

According to the present invention a simple and efficient connection is effected between the parts by shaping the abutting portion of the corrugated sheet metal in such manner that the corrugations are first subdivided into a great number of smaller substantially coaxial corrugations and the adjoining edge portion is then upset so as to form a plane surface. For instance, in sheet metal having comparatively large corrugations each of these corrugations is first converted into two smaller corrugations without any considerable upsetting being required, and these smaller corrugations can if necessary be subdivided so as to form still smaller corrugations and so on, until the width of the final corrugations has been reduced to such an extent that they offer only very little resistance to the upsetting and smoothing. By thus subdividing the corrugations I obtain a uniform distribution of the upsetting effect all over the respective parts of the corrugated sheet and I thereby enable it to be smoothed down without any folds being formed. In many cases the smallest corrugations obtained by the subdivision of larger ones need merely be upset in such manner that a plane edge is formed, riveting or the like being then effected intermediate the corrugations at some distance from the plane edge.

The subdivision of the corrugations and the upsetting is preferably effected by means of a top and a bottom die, each of which is formed with larger and smaller corrugations and with a plane portion, and I prefer employing dies extending over a plurality of large corrugations and if possible all over the width of the piece of sheet metal being treated.

In the drawings affixed to this specification and forming part thereof several corrugated sheet metal shapes embodying my invention are illustrated diagrammatically by way of example. In the drawings Fig. 1 is an end view of a sheet metal shape having large corrugations, the ends of which are subdivided into two smaller corrugations each.

Figure 2:
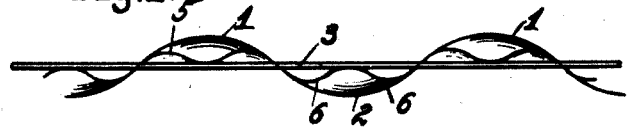

Fig. 2 is a similar view showing each half of the large corrugation subdivided into two smaller corrugations.

In both cases the smaller corrugations gradually merge into a plane edge portion.

Figure 3:
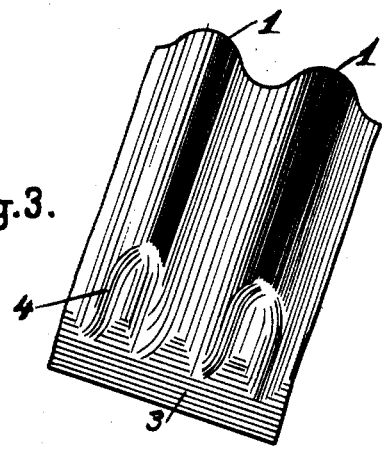
Figure 4:
Figure 5:
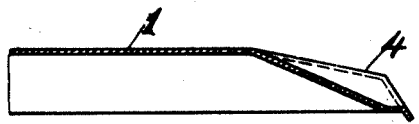

Fig. 3 is a structural view, drawn to a smaller scale, of the shape illustrated in Fig. 1, Figs. 4 and 5 are an end view and axial cross-section of a further form.

Referring first to Figs. 1 and 3, 1, 1 are a large or main corrugation, 2 is the depression between two such corrugations, and 3 is the plain edge portion. The ends of the large corrugations adjoining these large portions are subdivided each into two smaller corrugations 4, so as to represent the aspect of forks, the plane edge portion being formed by simply smoothing down by pressure the outer ends of the small corrugations 4. In order to obtain this shape, the ends of the large or main corrugations can be transformed into smaller corrugations extending to the edge of the sheet, whereupon the edge portion of the smaller corrugations is smoothed down by pressure exerted upon it by a further pair of dies.

In the majority of cases, however, the large or main corrugations can be converted into a plane edge portion with smaller corrugations adjoining it, by shaping the edge portion by means of a single pair of dies, either in a single operation or in several subsequent operations, the extreme edge portion of the sheet being first inserted between the dies and the sheet being then gradually introduced further between the dies, so that the edge portion of the sheet is shaped in several consecutive operations.

As shown in Fig. 2 the smooth edge portion 3 is formed in the central layer intermediate the ridges 1 and the depressions 2 of the main corrugations, each ridge 1 being subdivided into a pair of smaller corrugations 5 and in a similar manner each depression 2 being subdivided into two smaller corrugations 6. These smaller corrugations 5 and 6 have only one half of the width of the smaller corrugation 4 illustrated in Fig. 1, and in consequence thereof can be upset or smoothed down in an easier way. Obviously therefore, this latter modification is more suitable for thin sheets and it further offers the advantage of the smooth edge portion being arranged in the neutral intermediate part of the corrugated sheet, which is desirable in order to keep the sheet as strong as possible. In those cases where the corrugations abut against an edge in oblique direction, the ends of the smaller corrugations can extend in a corresponding oblique direction, inasmuch as the alternately unequal shapes of these ends of the smaller corrugations do not form any obstacles to the transformation of large corrugations into smaller ones nor to the pressing down of the ends of the smaller corrugations.

The sheet illustrated in Figs. 4 and 5, while corresponding in all other respects to the form illustrated in Figs. 1 and 3, shows an end formation of the smaller corrugations 4 by which a plane connecting edge is obtained. In this case riveting is effected in the single depressions between the corrugations, and the smaller corrugations 4 are preferably upset in such manner that before the riveting operation has started the connecting edge is formed somewhat below the deepest depression, so that it is applied with particular force against the other part when riveting is started. In the same manner as shown in the drawings with reference to an outer edge of a corrugated sheet, plane transverse webs can also be formed intermediate the ends of an endless web of corrugated sheet metal, these plane webs extending either at right angles or at an acute angle or in a curve with reference to the corrugations. I may further form the corrugated sheet with plane portions having any desired configuration, and in all these cases these plane portions merge into the large or main corrugations by way of smaller corrugations. On the other hand a corrugated sheet metal cover can be formed in a similar manner with a plane circumferential edge.

While in Figs. 1–5 the invention is shown as applied to the marginal portion of a piece of sheet metal, Fig. 6 illustrates in longitudinal section the planing down of an intermediate part.

11 is one of the main corrugations and 12 is the part planed down by pressure. 14, 14 are the smaller corrugations.

In Figs. 7–10 several forms of a pair of dies for acting on corrugated sheet metal in accordance with the present invention are illustrated, Fig. 7 being a lateral end view, while Figs. 8, 9 and 10 are cross-sections on the lines VIII—VIII, IX—IX, X—X of Fig. 7, respectively.

The dies shown in Fig. 7 allow transforming in a single operation the main corrugations of a piece of sheet metal 20 into smaller corrugations 21 and also to transform the end portion of these smaller corrugations into a plane edge portion 22. The device consists of a matrix or bottom die 24 and a patrix or top die 25, this latter acting in the direction of the arrow, a.

Fig. 11 illustrates a device adapted for being first applied to the marginal portion of the piece of sheet metal such as 30, and by means of which the main corrugations are transformed into smaller corrugations and part of these latter into a plane edge portion by gradually displacing the dies relatively to the sheet metal or vice versa in the longitudinal direction of the corrugations. The device here comprises a matrix 31 and patrix 32, both being guided in guides 33. The arrows b, b indicate the direction of movements for the transformation, while arrows c, c indicate the direction of relative movement of the dies and the metal. The parts are shown in Fig. 11 in the position which they assume after the last portion has been carried through.

I wish it to be understood that I do not desire to be limited to any details of construction or operation shown and described for obvious modifications will occur to a person skilled in the art.

I claim:—

1. As a new article of manufacture, a piece of corrugated sheet metal having part only of a corrugation subdivided into a plurality of smaller corrugations parallel thereto and merging into a plane metal portion.

2. As a new article of manufacture, a piece of corrugated sheet metal comprising a comparatively large corrugation, a plurality of smaller corrugations parallel thereto and extending over part of said large corrugation and a plane metal portion adjoining said small corrugations.

3. As a new article of manufacture, a piece of corrugated sheet metal comprising a plurality of comparatively large corrugations, smaller corrugations formed in the end of every large corrugation adjoining the edge of the piece and a plane metal portion adjoining said ends.

4. As a new article of manufacture, a piece of corrugated sheet metal comprising a plurality of comparatively large corrugations, smaller corrugations formed in the end of every large corrugation adjoining the edge of the piece and a plane metal portion adjoining said ends, said plane portion extending in the middle between the crests and the depressions of the corrugations.

5. The process of treating corrugated sheet metal for the purpose of connection, comprising forming by pressure a plurality of smaller corrugations in part only of one of the regular corrugations so as to subdivide part of this latter.

6. The process of treating corrugated sheet metal for the purpose of connection, comprising forming by pressure a plurality of smaller corrugations in part of one of the regular corrugations so as to subdivide part of this latter and transforming by pressure part of the metal adjoining said smaller corrugations into substantially plane metal.

7. The process of treating corrugated sheet metal for the purpose of connection, comprising forming by pressure a plurality of smaller corrugations in the ends of the regular corrugations adjoining an edge and transforming by pressure the edge portion adjoining said smaller corrugations into plane metal.

8. The process of treating corrugated sheet metal for the purpose of connection, comprising transforming the regular corrugation in several consecutive pressing operations, beginning at the ends and progressing in the longitudinal direction of said regular corrugations into a plurality of smaller corrugations and thereafter transforming by pressure the edge portion into plane metal.

9. The process of treating corrugated sheet metal for the purpose of connection, comprising transforming the regular corrugations in several consecutive pressing operations, beginning at the ends and progressing in the longitudinal direction of said regular corrugations into a plurality of smaller corrugations, treating in a similar manner the said smaller corrugations so as to subdivide each of them into a plurality of still smaller corrugations and thereafter transforming by pressure these still smaller corrugations into plane metal.

In testimony whereof I affix my signature.

HUGO JUNKERS.